United States Patent
Hanada et al.

(10) Patent No.: US 6,427,793 B1
(45) Date of Patent: Aug. 6, 2002

(54) CATALYST TEMPERATURE CONTROL DEVICE FOR HYBRID VEHICLE

(75) Inventors: Kohei Hanada; Masao Kubodera; Tetsu Sugiyama, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/634,719

(22) Filed: Aug. 7, 2000

(30) Foreign Application Priority Data

Aug. 9, 1999 (JP) .......................................... 11-225851
Jun. 27, 2000 (JP) ...................................... 2000-193253

(51) Int. Cl.$^7$ ................................................ B60K 1/00
(52) U.S. Cl. ..................... 180/65.2; 180/65.3; 180/65.4
(58) Field of Search ..................... 180/65.2, 65.3, 180/65.4, 65.6, 65.7, 309; 60/285, 286, 300, 303

(56) References Cited

U.S. PATENT DOCUMENTS

| | | | | |
|---|---|---|---|---|
| 5,588,498 A | * | 12/1996 | Kitada | 180/65.4 |
| 5,785,137 A | * | 7/1998 | Reuyl | 180/65.2 |
| 5,785,138 A | * | 7/1998 | Yoshida | 180/65.2 |
| 5,865,263 A | * | 2/1999 | Yamaguchi et al. | 180/65.2 |
| 6,032,753 A | * | 3/2000 | Yamazaki et al. | 180/65.3 |
| 6,057,605 A | * | 5/2000 | Bourne et al. | 290/40 C |
| 6,253,866 B1 | * | 7/2001 | Kojima | 180/65.2 |

* cited by examiner

Primary Examiner—Robert P. Olszewski
Assistant Examiner—James S. McClellan
(74) Attorney, Agent, or Firm—Armstrong, Westerman & Hattori, LLP

(57) ABSTRACT

A hybrid vehicle is provided in which even if the temperature of a catalyst is decreased after a long period of travel by means of a motor, the temperature of the catalyst can be increased immediately and the exhaust of harmful materials can be suppressed. A hybrid vehicle having a normal travel mode as a travel mode in which travel is conducted while switching between motor travel and engine travel in accordance with the degree of the depression of an accelerator, comprising: a switching device being capable of switching between the normal travel mode and a specific travel mode in which travel is conducted only by means of an engine irrespective of the degree of the depression of the accelerator; an activity detector for detecting activity of a catalyst provided in the exhaust system of the engine employed in the engine travel; and a determination device for determining whether or not the catalyst is activated; wherein when the determination device determines that the catalyst is not activated, the switching device compels the switching of the travel mode to the specific travel mode engine.

4 Claims, 3 Drawing Sheets

CATALYST TEMPERATURE CONTROL DEVICE FOR HYBRID VEHICLE

BACKGROUND OF THE INVENTION

1. Field of the Invention

The present invention relates to a hybrid vehicle, and in particular, relates to an apparatus which increases the ability of the exhaust emission of hybrid vehicles. This application is based on Japanese Patent Application No. Hei 11-225851, the contents of which are incorporated herein by reference.

2. Description of the Related Art

Conventionally, the development of electric automobiles was advanced in order to reduce the emission of exhaust gases into the atmosphere. However, these electric automobiles, which traveled using only electrical energy, had a limited cruising range as a result of the capacity of the storage devices which stored electrical energy. In order to attain a sufficient cruising range, storage apparatuses having enormous capacity were required, and this dramatically reduced the travel performance of the vehicles.

Development has also advanced in hybrid vehicles, in which an engine is operated using fossil fuels, and the electrical energy described above is augmented with the mechanical energy of this engine, and thereby, the storage devices are reduced in size, and it is possible to obtain sufficient cruising range and vehicle travel performance.

In parallel hybrid vehicles, which are a type of hybrid vehicle, travel is conducted in such a manner as to switch between motor travel, which employs electricity, and engine travel, which utilizes fossil fuels. In such a parallel hybrid vehicle, when motor travel continues for a long period of time, as the engine is stopped during this period, no high temperature exhaust gases which are expelled by the engine while the engine is driven flow in the exhaust passage during this long period of time, and as a result the temperature of the catalyst in this exhaust passage drops, and this negatively affects the ability of the catalyst to clean the gases.

Accordingly, the temperature of the catalyst will be decreased after a long period of motor travel. In such situation, there is a problem in that if a travel mode of the hybrid vehicle is switched between engine travel and motor travel at a later time, then whenever switches to engine travel are made, the exhaust of harmful materials is increased at once after every switch.

SUMMARY OF THE INVENTION

The present invention was created in order to solve this problem, and it provides a hybrid vehicle in which a switch to a specific travel mode is made after a long period of travel by means of a motor so as to immediately increase the temperature of the catalyst, so that there is no increase in the exhaust of harmful materials.

In a first aspect of the present invention, a hybrid vehicle having a normal travel mode as a travel mode in which travel is conducted while switching between motor travel and engine travel in accordance with the degree of the depression of an accelerator, comprising: a switching device (in the embodiment described hereinbelow, a control circuit 23) being capable of switching between the normal travel mode and a specific travel mode in which travel is conducted only by means of an engine (in the embodiment described hereinbelow, an engine E) irrespective of the degree of the depression of the accelerator; an activity detector (in the embodiment described hereinbelow, a catalyst temperature sensor 18) for detecting activity of a catalyst (in the embodiment described hereinbelow, a catalyst 17) provided in the exhaust system (in the embodiment described hereinbelow, the exhaust system 16) of the engine employed in the engine travel; and a determination device (in the embodiment described hereinbelow, a control circuit 23) for determining whether or not the catalyst is activated; wherein when the determination device determines that the catalyst is not activated, the switching device compels the switching of the travel mode to the specific travel mode.

By means of the structure described above, the determination device determines whether or not the catalyst is activated, and when it determines that the catalyst is not activated, the switching device switches the normal travel mode to the specific travel mode in which the hybrid vehicle travels only by means of the engine, so that the high temperature exhaust gas travels from the engine to the catalyst provided in the exhaust system, the temperature of the catalyst increases, the catalyst becomes activated, and an increase in the exhaust of harmful materials is prevented.

In a second aspect of the present invention, the activity detector detects the activity of the catalyst when motor travel has continued for a predetermined period of time.

By means of the structure described above, when motor travel continues for a predetermined period of time in the normal travel mode, the engine is stopped during this period of time, the temperature of the catalyst decreases, and there is a great possibility that the catalyst will enter an inactive state. As a result of this, the activity of the catalyst is no longer detected. The determination device determines whether or not the catalyst is activated, and when it determines that the catalyst is not activated, the switching device switches the normal travel mode to the specific travel mode in which the hybrid vehicle travels only by means of the engine, so that high temperature exhaust gases travel from the engine to the catalyst provided in the exhaust system, the temperature of the catalyst increases, the catalyst becomes activated, and it is thus possible to prevent an increase in the exhaust of harmful materials.

DETAILED DESCRIPTION OF THE PREFERRED EMBODIMENTS

Figure 1:
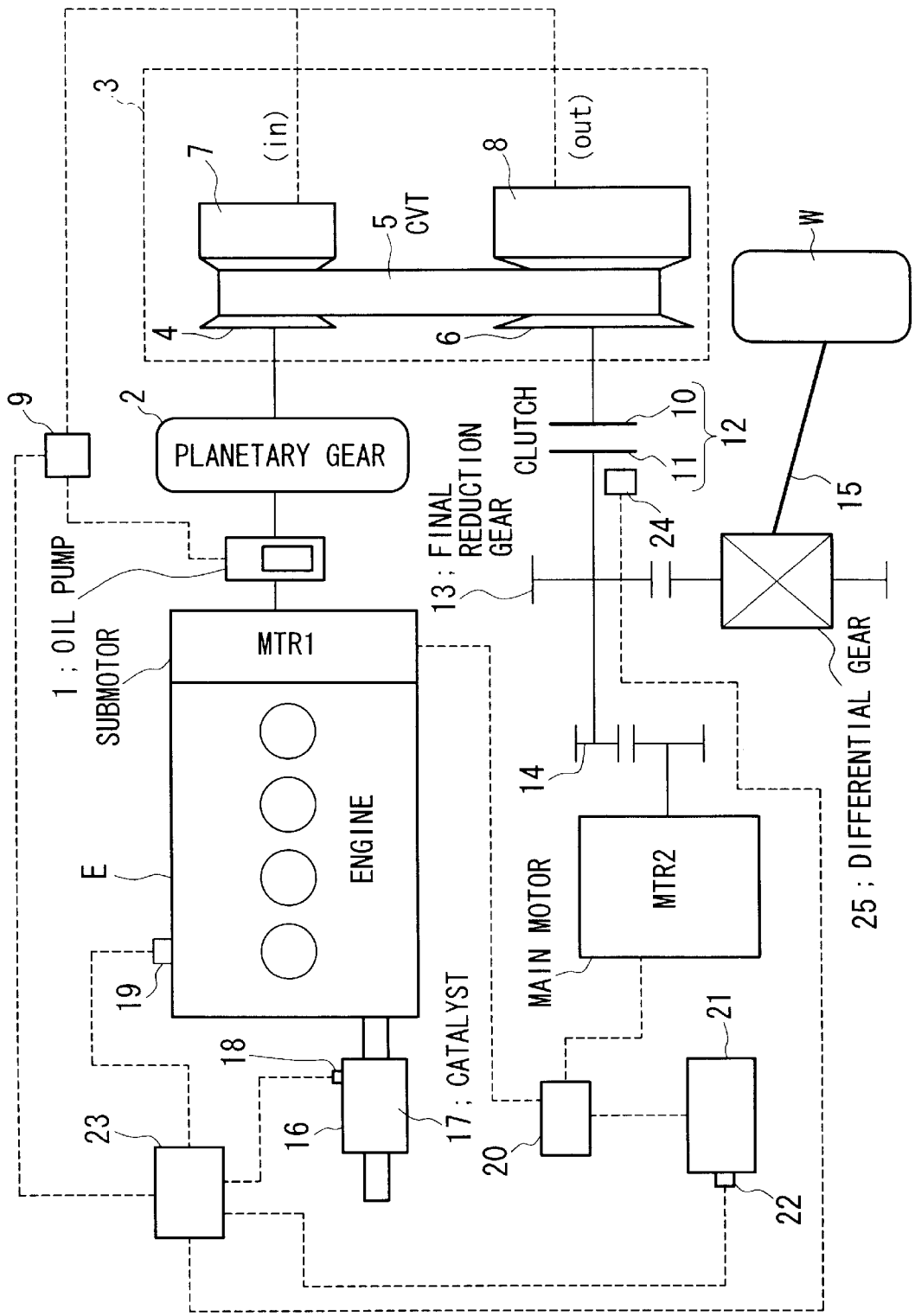
FIG. 1 is a schematic view showing the power transmission system and the control system of the hybrid vehicle which is an embodiment of the present invention.

FIG. 1 is a schematic showing the power transmission system of the hybrid vehicle and the control system which, serves to control the power transmission. In the power transmission system, the power of engine E is input into a planetary gear 2 which switches among forward and reverse progress, via a submotor MTR1 and an oil pump 1. This planetary gear 2 is mechanically coupled with a select lever which is not depicted in the figure. By manipulating this select lever, when the power, which is output by the engine E and is input into the drive side pulley 4 of a CVT (Continuously Variable Transmission) 3, is input into the drive side pulley 4, the direction of rotation of the power is switched.

Furthermore, the rotation of drive side pulley 4 is transmitted to driven side pulley 6 via metal belt 5. Here, the revolution ratio between the drive side pulley 4 and the driven side pulley 6 is determined by the winding diameter of each pulley with respect to the metal belt 5, and this winding diameter is controlled by the applied force generated by oil pressure applied to the side chambers 7 and 8 of each pulley. This oil pressure is generated by the oil pump 1 driven by engine E and is supplied to the side chambers 7 and 8 via an oil pressure control apparatus 9.

The driven side pulley 6 is connected to the output axle of main motor MTR2 for drive/regeneration via a clutch 12 comprising a pair of engaging elements 10 and 11, a final reduction gear 13, and a gear 14. The drive power of the driven side pulley 6 is communicated to a differential gear 25 via the final reduction gear 13, and the transmitted drive power is further transmitted to vehicle axle 15, and the drive wheel W is caused to rotate. Furthermore, the drive power of the main motor MTR2 is communicated to the vehicle axle 15 via gear 14, final reduction gear 13, and differential gear 25, and causes the drive wheel W to rotate.

The exhaust gas from the engine E is exhausted into the atmosphere via an exhaust system 16. A catalyst 17 which serves to clean the exhaust gas is provided within this exhaust system 16. Furthermore, a catalyst temperature sensor 18, which serves to detect the temperature of the catalyst 17, is provided in this exhaust system 16.

Furthermore, a water temperature sensor 19, which serves to detect the water temperature of cooling water in engine E, is provided in this engine E.

The rotational operation of the submotor MTR1 and the main motor MTR2 is controlled by a power drive unit 20. Electrical energy is provided from battery 21 to the power drive unit 20, and this electrical energy is supplied to the submotor MTR1 and main motor MTR2 via the power drive unit 20. A voltage sensor 22, which detects the state of charge (remaining charge) of the battery, is provided in battery 21.

The power transmission system is controlled by control circuit 23; that is to say, the output results of the catalyst temperature sensor 18, the water temperature sensor 19, and the voltage sensor 22 are input into the control circuit 23, and by means of this, the control circuit 23 is capable of assessing the temperature of the catalyst 17, the water temperature of the cooling water in engine E, and the state of charge of battery 21.

Furthermore, control circuit 23 is also connected with the oil pressure control apparatus 9, and is capable of detecting and controlling the oil pressure supplied to the side chambers 7 and 8 of CVT3 via the oil pressure control apparatus 9. By means of this, the control circuit 23 is able to assess the transmission gear ratio of CVT3, and to control this.

Furthermore, control circuit 23 is connected to a clutch control actuator 24, which serves to control the disengagement and engagement of the engaging elements 10 and 11 of clutch 12, and is capable of controlling the engagement and opening operations of the clutch 12.

Figure 2:
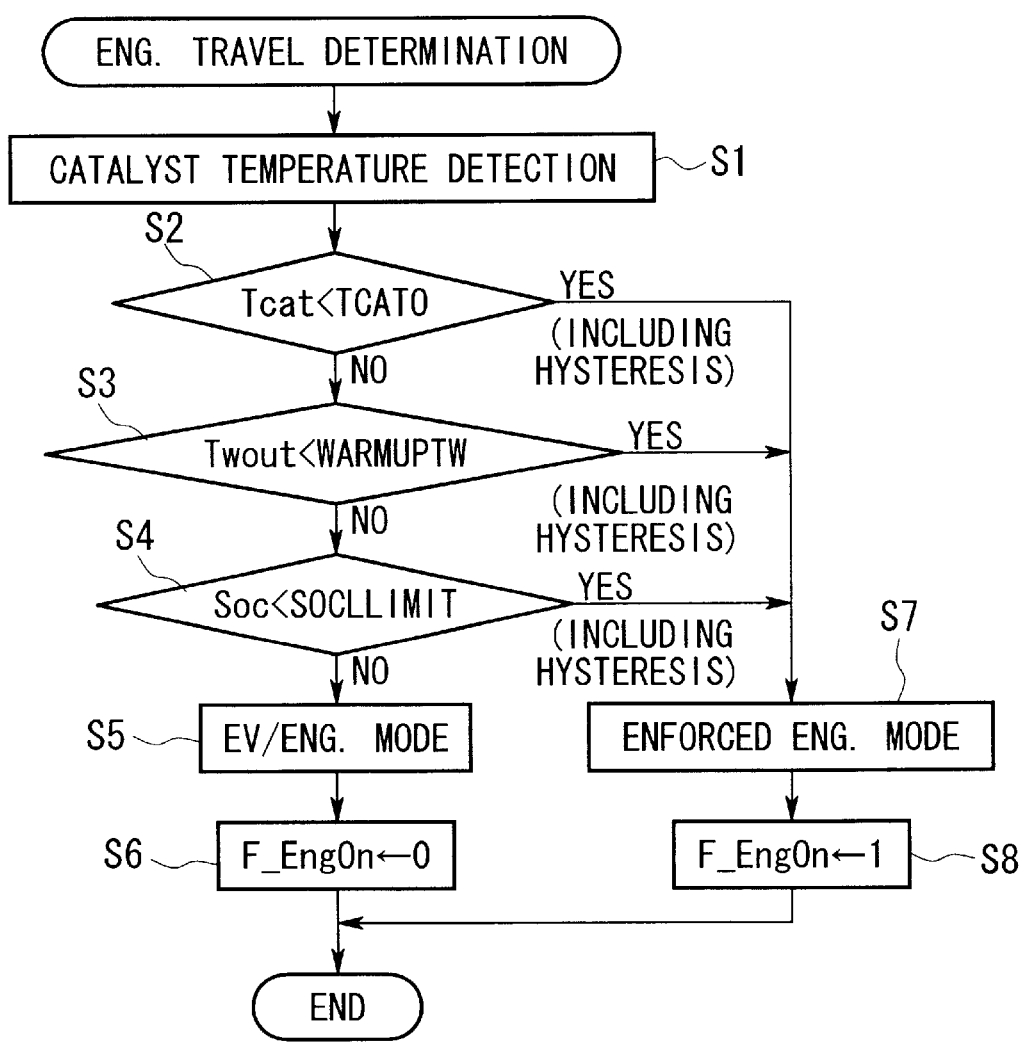
FIG. 2 is a flowchart showing the flow when switching the travel mode.

Next, the operation of the present embodiment will be explained with reference to the flowchart of FIG. 2. The flowchart shown in FIG. 2 shows the flow which serves to switch the travel mode between a normal travel mode and a specific travel mode; this is executed when travel by means of the motor has been continued for a set period of time. In the following description, references such as SI and the like refer to steps within the flowchart.

First, the catalyst temperature Tcat is detected by the catalyst temperature sensor 18 (Si). Next, the detected catalyst temperature Tcat is compared with a reference temperature, that is to say, the lower limit temperature TCATO at which the catalyst is activated, and when Tcat is less than TCATO, that is to say, when the catalyst temperature is lower than the reference temperature and thereby, a determination is made that the catalyst is inactivated, control proceeds to step S7, and in other cases, control proceeds to step S3.

In step S3, the water temperature Twout detected by the water temperature sensor 19 is compared with a reference temperature WARMUPTW of the water, and when Twout is less than WARMUPTW, control proceeds to step S7, while in other cases, control proceeds to step S4.

In step S4, the state of charge Soc of the battery detected by the voltage sensor 22 is compared with a reference value SOCLLIMIT of the state of charge of the battery, and when Soc is less than SOCLLIMIT, control proceeds to step S7, while in other cases, control proceeds to step S5.

In step S5, the travel mode is set to the EV/Eng. mode; that is to say, the normal travel mode is set in which the motor travel (EV travel) and the engine travel (Eng. travel) are concomitantly employed and these are switched in accordance with the driving conditions including the degree of the depression of the accelerator. Then, in the subsequent step S6, the enforced engine start flag F_EngOn is set to 0.

In step S7, the travel mode is set to the enforced Eng. mode; that is to say, the specific travel mode is set in which the travel is compulsorily conducted only by means of the engine, irrespective of the driving conditions including the degree of the depression of the accelerator. Then, in the following step S8, the enforced engine start flag F_EngOn is set to 1.

Figure 3:
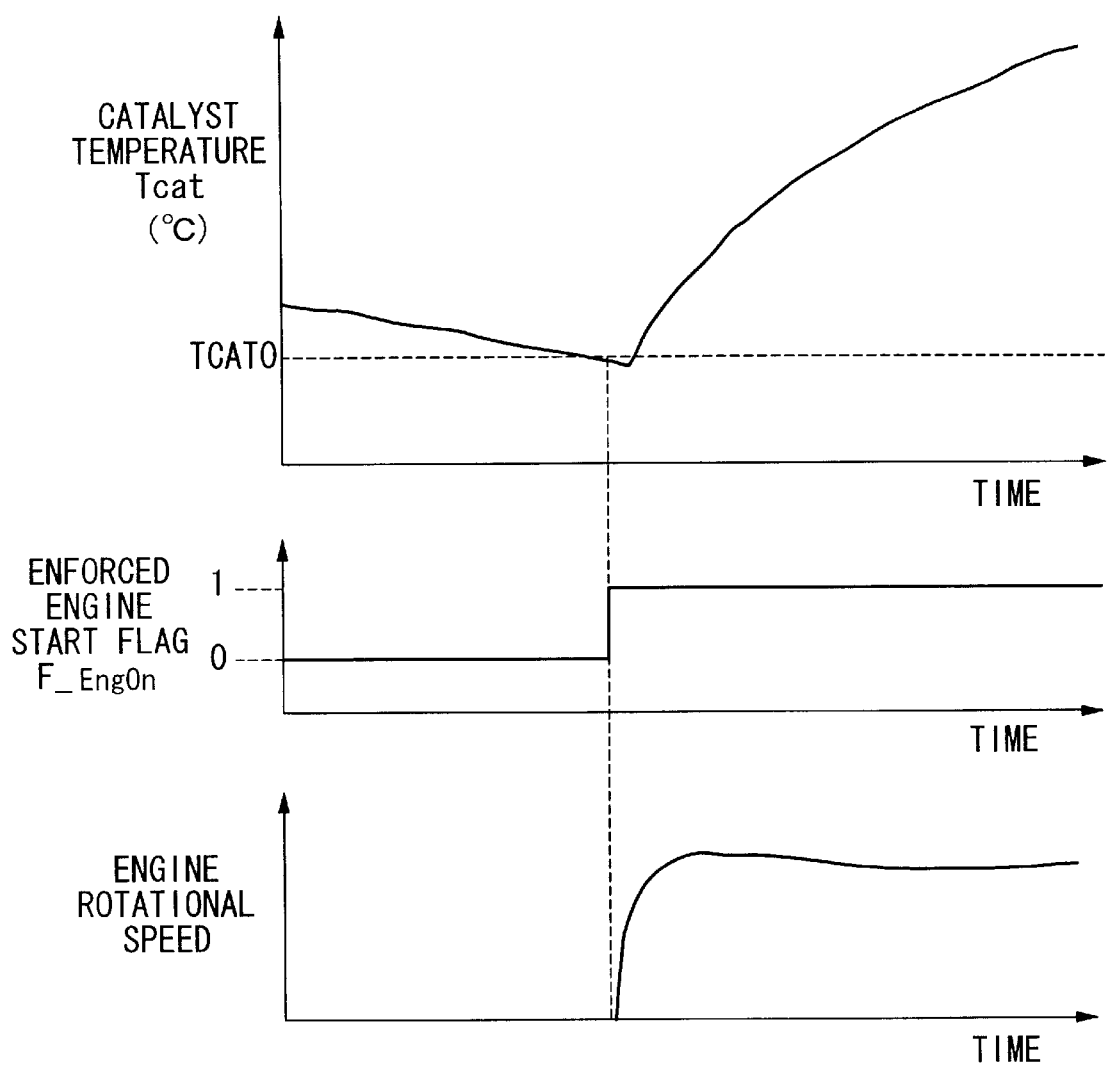
FIG. 3 is a graph showing the relationship between the catalyst temperature, the enforced engine start flag, and the engine rotational speed.

In the flowchart described above, as shown in FIG. 3, when the catalyst temperature Tcat becomes lower than the lower limit temperature TCATO, then the enforced engine start flag F_EngOn is set to 1. This enforced engine start flag F_EngOn is detected in a separate flowchart from the flowchart described above, and when F_EngOn has a value of 1, the engine E is started in a compulsory manner.

Furthermore, in accordance with the flowchart described above, when the water temperature Twout of the cooling water in the engine E drops below the reference temperature WARMUPTW, then the enforced engine start flag F_EngOn is set to a value of 1, and the engine E is compulsorily started.

Furthermore, in accordance with the flowchart described above, when the state of charge Soc of the battery 21 falls below a reference value SOCLLIMIT, then the enforced engine start flag F_EngOn is set to a value of 1, and the engine E is compulsorily started. Furthermore, in this case, the charging mode is entered, and the submotor MTR1 is driven by the engine E, and the electrical energy generated by this submotor MTR1 is used to charge the battery 21.

In the embodiment described above, the catalyst temperature sensor 18, which directly detects the temperature of the catalyst or the like, is used as a temperature detecting device. However, the temperature of the catalyst can be calculated based on the water temperature of the engine, the driving conditions or the like, then such calculations can be used to determine the temperature of the catalyst.

In accordance with the present embodiment, when travel by means of the motor continues during the normal travel mode, the temperature of the catalyst drops, and the catalyst reaches a state in which it is likely to become inactive, the engine is compulsorily started by switching to the specific travel mode, and high temperature exhaust gas is sent to the catalyst, so that the temperature of the catalyst rises, and a state is maintained in which the catalyst is activated, and it is thus possible to prevent an increase in the exhaust of harmful substances.

Furthermore, in accordance with the present embodiment, when travel by means of the motor continues for a predetermined period of time in the normal travel mode and the engine is stopped during this period of time, the temperature of the catalyst is detected, and then it is determined whether the catalyst is activated based on the detected temperature, and when it is determined that the catalyst is not activated, the travel mode is switched to the specific travel mode in which the hybrid vehicle travels only by means of the engine. Accordingly, the high temperature exhaust gases travel from the engine to the catalyst provided in the exhaust system, the temperature of the catalyst increases, and then the catalyst becomes activated, so it is possible to prevent an increase in the exhaust of harmful materials.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A hybrid vehicle having a normal travel mode in which travel is conducted while switching between motor travel and engine travel in accordance with the degree of the depression of an accelerator, comprising:

a switching device being capable of switching between said normal travel mode and a specific travel mode in which travel is conducted only by means of an engine irrespective of said degree of the depression of the accelerator;

an activity detector for detecting activity of a catalyst provided in an exhaust system of said engine employed in said engine travel; and a determination device for determining whether or not said catalyst is activated, wherein, when said determination device determines that said catalyst is not activated, said switching device compels the switching of the travel mode to said specific travel mode.

2. A hybrid vehicle in accordance with claim 1, wherein said activity detector detects said catalytic activity when said motor travel has continued for a predetermined period of time.

3. A hybrid vehicle according to claim 1, further comprising:

a water temperature detector for detecting the temperature of cooling water in said engine, wherein when said determination device determines that said catalyst is activated and when the temperature of said cooling water is below a predetermined temperature, said switching device compels the switching of the travel mode to said specific travel mode.

4. A hybrid vehicle according to claim 1, further comprising:

a remaining charge detector for detecting the remaining charge of a battery, wherein when said determination device determines that said catalyst is activated and when the remaining charge of said battery is below a predetermined charge, said switching device compels the switching of the travel mode to said specific travel mode.

* * * * *